United States Patent [19]
Gorelick et al.

[11] Patent Number: 4,739,352
[45] Date of Patent: Apr. 19, 1988

[54] ELECTRONIC CONTROL OF IMAGING SYSTEM

[75] Inventors: Donald E. Gorelick, Nashua; John M. Rockstroh, Hudson, both of N.H.

[73] Assignee: Itek Graphix Corp., Lexington, Mass.

[21] Appl. No.: 531,157

[22] Filed: Sep. 9, 1983

[51] Int. Cl.[4] .............................................. B41B 19/00
[52] U.S. Cl. .......................................... 354/6; 354/5; 400/124
[58] Field of Search ........................... 354/5, 6, 7, 8, 9; 400/124

[56] References Cited

U.S. PATENT DOCUMENTS

| | | | |
|---|---|---|---|
| 3,512,518 | 1/1970 | Scarbrough . | |
| 3,952,311 | 1/1976 | Lapeyre . | |
| 4,229,086 | 10/1980 | Beery et al. | 354/5 |
| 4,318,597 | 3/1982 | Kotani et al. | 354/5 |
| 4,342,504 | 8/1982 | Ebner | 354/7 |
| 4,344,079 | 8/1982 | Chambors . | |
| 4,376,282 | 3/1983 | Kotani et al. | 354/5 |
| 4,378,149 | 3/1983 | Ebner | 354/5 |
| 4,427,275 | 1/1984 | Stalzer | 354/5 |
| 4,435,064 | 3/1984 | Tsukada et al. | 354/5 |
| 4,447,126 | 5/1984 | Heidrich et al. | 354/5 |
| 4,459,050 | 7/1984 | Goldberg et al. | 400/124 |

FOREIGN PATENT DOCUMENTS

| | | |
|---|---|---|
| 0040313 | 1/1981 | European Pat. Off. . |
| 0056081 | 1/1982 | European Pat. Off. . |
| 2082512 | 1/1982 | United Kingdom . |

OTHER PUBLICATIONS

"Arrangement for Data Merging and Line Splitting in Printers", IBM Technical Disclosure Bulletin, vol. 16, No. 5, pp. 1594-1595, (Oct. 1973).

*Primary Examiner*—Russell E. Adams
*Attorney, Agent, or Firm*—Morgan & Finnegan

[57] ABSTRACT

In a phototypesetter, an array of light emitting diodes is energized in synchronization with an associated staggered array of fiber optic filaments. The array of filaments is slanted relative to the direction of movement, and type may be set in both forward and reverse directions. Type font data is stored in a compressed form in a first microprocessor subsystem. That compressed data is expanded in real time for each character in a high speed microprocessor subsystem. Character image data in the form of character contours is written into alternating RAM groups. The contour data is then read from the RAM groups on a slice basis and color data is generated. The alternate RAM groups allow for proper coloring of overlapping character images. The expanded data is then handled by a logic unit to allow for the staggered fiber optic filaments and for the slant of the fiber optic filament head in both forward and reverse directions. The data bits for each slice of type is divided into odd and even bytes which are in turn written into and read from a random access memory in a sequence determined by a programmable read only memory. Memory control bits in the high speed subsystem are obtained directly from a microinstruction memory.

26 Claims, 5 Drawing Sheets

ELECTRONIC CONTROL OF IMAGING SYSTEM

DESCRIPTION

1. Technical Field

This invention relates to imaging systems, and in particular to the control of light sources in synchronization with scanning fiber optics in phototypesetters.

2. Background

During the last 30 years, numerous so-called second generation phototypesetters have been marketed. These machines flash-illuminate characters positioned upon a whirling character disk or drum, and the resulting optical image is projected by a lens system upon a photosensitive film. The size of the characters are changed by means of moving zoom lenses or the like or by rotating a lens turret to position various lenses at the optical projectioon axis. The characters are sequentially recorded upon the photosensitive film by mechanically scanning such film. The film carriage may be moved relative to the optical axis, the projection lenses may be moved relative to the film platen, the whirling character disk may be moved relative to the film platen, or various combinations of the foregoing may be employed to sequentially project the characters upon the film to form a line of characters. Generally, the projection lens carriage assemblies are relatively heavy and bulky, as is the drum or disk bearing the images of the characters to be projected. Also, changes in the fonts involve manual replacement of the character disks, or film strips mounted upon a drum. Additionally, the electro-mechanical stepping devices for producing the above mentioned scanning motions are also relatively bulky and cumbersome. The speed of second generation machines is limited by the output carriage escapement speed and by character access time determined by the rotational speed of the font disk.

So-called third generation phototypesetters were introduced in the 1960s, most of which utilize cathode ray tubes for generating the characters upon the faces of the tubes. These character images are thereafter optically projected upon the film. In contrast with the components of the second generation machines, the electron beam is essentially unhindered by inertia and the computer codes thus may actuate the beam at much higher speeds than those obtainable by the second generation machines. Laser generated light beams have also been employed rather than cathode ray tubes. Many font families may be generated by these machines since the character generating codes may be densely packed during recording upon magnetic storage media, such as floppy disks. Also, the character size may be electronically changed by changing the length of the beam traces making up the character components (See FIG. 1 of U.S. Pat. No. 3,952,311).

The result of the foregoing is that these machines have higher speeds, and greater flexibility in the character shapes and sizes produced. However, the third generation machines are usually considerably more expensive than the second generation machines; in 1979, they typically sold for $40,000 and more. In contrast, second generation machines in 1979 were marketed for around $10,000.

A fourth generation typesetter is disclosed in U.S. Pat. No. 4,342,504 to Peter Ebner, for an LED-fiber optic character printer. The fourth generation typesetter can be marketed for about $10,000, and yet it has the speed and flexibility of the third generation machines. These results have been accomplished by providing a flexible ribbon of a small number of fiber optic filaments. Each filament is illuminated by one of a matrix of light emitting diodes (LEDs) and has its output end positioned within a printing head. The printing head has at least one relatively short linear array of fiber optic filaments embedded therein. Means are provided for causing the head to scan across the photosensitive material and to record a line of type thereon with light provided by selective energization of the LEDs. The invention claimed in the above application utilizes a loop of fiber optic cable comprising fiber optic filaments mounted upon a belt-like substrate. This flexible fiber optic loop enables rapid scanning by the printing head with a fiber optic cable containing a drastically reduced number of fiber optic filaments, for example, 128, in contrast with the thousands of filaments called for by prior cables in general usage.

A principle object of the present invention is to provide an electronic control system for fourth generation typesetters.

DISCLOSURE OF THE INVENTION

In accordance with one aspect of this invention, the sequence of control of an array of imaging elements is established electronically to account for the dependence of the sequencing on the relative displacement of imaging elements in a staggered array of elements and on the direction of scan of a tilted array. Image element control data is supplied in a sequence which is independent of the staggered relationship of the imaging elements and the direction of scan. A random access memory is sequentially addressed and the control data is written into the memory in a first sequential order. The control data is subsequently read from the memory in an order other than that first sequential order to delay certain of the element control data in the random access memory. This new sequence of control data is then applied to an imaging element driver.

Preferably, the sequential addressing of the random access memory is obtained from a read only memory which stores a first address sequence for forward scan and a second address sequence for reverse scan. Further, at each memory location of the random access memory, data is first read from that location and new data is then immediately written into that location. The element control data is delayed by addressing groups of memory locations and the groups are greater in number for the data which is to be delayed than for the data which is not to be delayed. Thus, once a byte of data is written into memory at a particular address, subsequent data bytes are written into groups of memory locations before the first data byte is read from the memory, and the number of groups determines the time delay between write in and read out. In reverse scan, the sequential order of addressing within each group of memory locations is alternated such that data written into the random access memory in one order within the group is subsequently read from the memory in reverse order during a subsequent address sequence.

In the preferred control of the imaging elements, data bytes are segregated according to the staggered leading and lagging rows of pels to which they correspond. In forward scan, the bytes are written into and read from the random access memory in the same sequential order; however, the bytes corresponding to the lagging row of pels are stored in the memory for an additional odd/even time which corresponds to the difference in times at which the staggered rows pass each slice. In reverse scan the bytes of successive slices are read out of storage in a reverse order. Each byte of the lagging rows is held in storage for a slice time which corresponds to the difference in times at which each row passes adjacent slices plus an odd/even time which corresponds to the difference in times at which the staggered leading and lagging rows pass each slice. The leading rows are only stored for a slice time.

In accordance with other aspects of the invention, memory control bits such as row address strobe and column address strobe signals for a dynamic memory are part of an instruction word from a program memory. Thus, the instruction word from the program memory includes instruction bits and address bits required by the central processor and additional data memory control bits. The need for extensive memory control circuitry is thereby avoided.

In accordance with further aspect of the invention a character contour is written into an electronic memory in which the memory addresses correspond to specific pel locations in a character image. Image data corresponding to slices of pels in the character image is read from the memory for successive slices through the character. Color data for each pel in each slice is provided by changing the pel color as a character contour is intersected. By writing the character contours of successive image characters into alternate memory segments and subsequently combining the color data in logic circuitry, problems due to overlap of characters are avoided.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

PREFERRED EMBODIMENT OF THE INVENTION

The control system of this invention has been designed for use in a phototypesetting system such as described in U.S. Pat. No. 4,342,504 in the name of Peter Ebner.

Figures 1, 2, 3, 4:
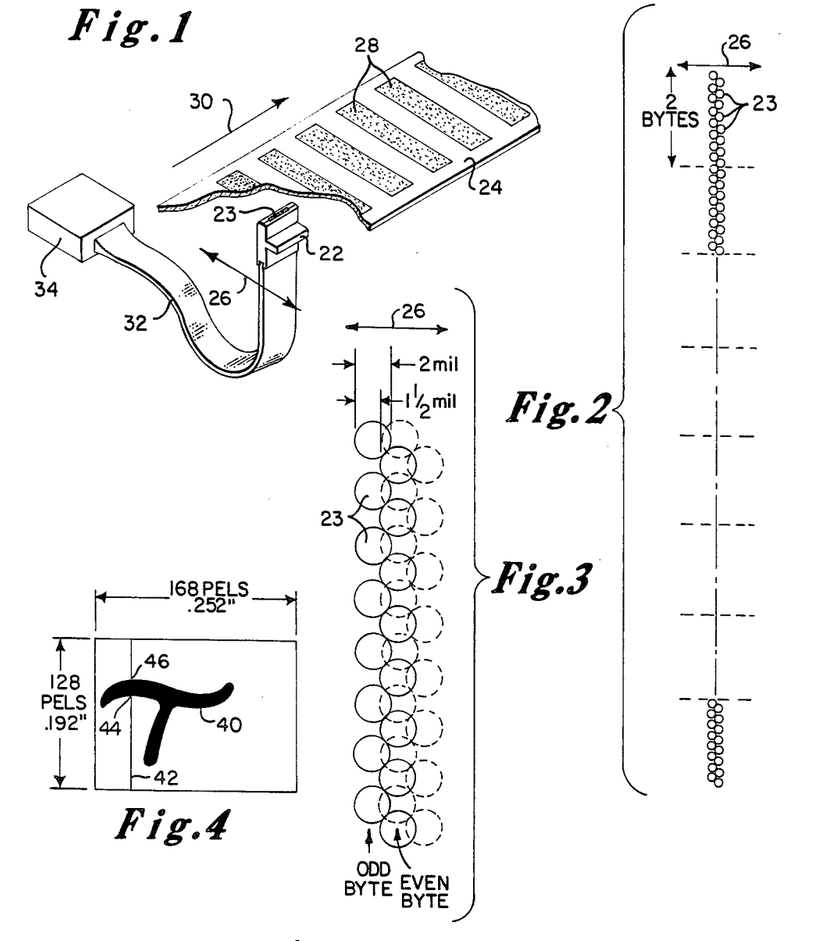
FIG. 1 is a perspective illustration of a phototypesetter having a scanning head associated with a light source array which may be controlled by the system of this invention.
FIG. 2 illustrates the arrangement of fiber optic elements in the scanning head of the system of FIG. 1.
FIG. 3 is an enlarged view of a two-byte group of fiber optic elements from FIG. 2.
FIG. 4 is an illustration of a character positioned within a character field segment.

As shown in FIG. 1, the phototypesetting system comprises a scanning head 22 which houses the ends of fiber optic filaments such that the end faces 23 are pressed against a photosensitive film 24. As the scanning head is moved across the film 24 in the directions indicated by arrow 26, the fiber optic elements are selectively energized to collectively provide a line of print 28 on the film 24. Once the head 22 is scanned across the film 24 in one direction to provide one line of print 28, the film is stepped in the direction 30. The scanning head 22 then scans the film in a reverse direction to provide a subsequent line of print.

The fiber optic filaments leading to the scanning head 22 are carried by a flexible, elastomeric belt 32 which leads from a stationary light source 34. As will be described below, the stationary light source includes an array of light emitting diodes (LEDs). The end face of each fiber optic filament is fixed to one LED of the array. Thus, by selectively energizing the LEDs as the scanning head 22 scans across the film 24, a high resolution phototypesetting operation can be obtained.

The particular scanning head used in the system has the fiber optic filaments 23 arranged in a 64×2 array as shown in FIG. 2. The filaments in the two columns of filaments are staggered as best shown in the exploded view of FIG. 3. In typesetting, the array of FIG. 2 is moved across the film in the directions indicated by arrow 26. As the array is moved from left to right as viewed in FIGS. 2 and 3, the leading group of filaments is referred to as the even filaments and the lagging set of filaments is referred to as the odd filaments.

The 128 filaments in the 64×2 array are conveniently considered as eight two-byte groups, a byte being eight bits of binary information. In this case, the binary information is the on/off state of an LED associated with each filament.

A single two-byte group of filaments in the scanning head is shown in exploded form in FIG. 3. As shown, each filament has a diameter of about 2 mils (0.002 inch). The filaments are arranged to overlap with a center-to-center, vertical or horizontal, distance between adjacent filaments of 1.5 mils. The LEDs are energized in synchronization with the scanning head movement such that odd bytes in one cycle of illumination are energized at the same location along the film 24 as the even bytes had been energized in the previous cycle. Thus, when the LEDs are first energized they are in the positions indicated by bold lines in FIG. 3, and in the next cycle they are energized at the locations indicated by the broken lines of FIG. 3.

It can be seen then that when properly energized in synchronization with the scanning movement, the odd and even bytes energized in successive cycles form a slice of overlapping exposure regions; a two-byte portion of a 16-byte slice is shown as solid and broken circles over the even byte designation in FIG. 3. Also, because the LEDs are energized with each 1.5 mil of movement, the successively illuminated LEDs form overlapping exposure regions along lines parallel to the direction of scanning movement.

By an extension of the overlapping exposure regions as shown in FIG. 3, it can be recognized that, with scanning of the scanning head across the film 24, an array of overlapping circular exposure regions of a height of 128 elements high and of a width determined by the length of scan is provided. It will be recognized, however, that to set a vertical line of a width of only one exposure region, for example, it is necessary to energize the even bytes at one instant and the odd bytes at the next instant. One of the features of the present system is that it provides for that displacement in time between the two sets of filaments positioned over a single slice of type.

As noted above, the exposure regions can be considered a large array of overlapping regions. With the present scanning head, those exposure regions, or pels, expose a segment 128 pels high, or 0.192 inch. The width of the scan determines the total width of a pel array, but a scan segment 168 pels wide, or 0.252 inch, is conveniently set electronically. Within that 128×168 segment, or character segment field, most characters can be defined in a single scan.

The term character is used here to refer to a graphic character to be printed and is not to be confused with a digital code. To designate an 8 bit digital code, the term "byte" is used exclusively.

To set a character within a 128×168 segment field, the on/off state of each LED as its associated fiber filament passes through each of the 168 slices of the segment must be defined. Thus, for each character segment field 128×168, or over 20,000, pels must be defined by over 20,000 bits of information stored in memory. Because just a single line of type may include as many as 55 such segments, the electronic storage space to define each character of a line and to properly energize the LEDs is very significant. A further feature of the present system is that it allows for storage of the character information in a condensed form. The character information is converted on a real time basis to an expanded, pel and slice oriented format prior to printing.

FIG. 4 shows a 128×168 pel character segment field with a character to be printed positioned therein. Because the scanning head prints a vertical slice at a time, or more properly even and odd portions of two adjacent slices, the signals driving the LEDs must be slice oriented. Within each slice, 128 signals must be applied to the 128 LEDs to control whether the LED is "on" to provide a dark pel or "off" to provide a light pel. As noted, the 128 bits of data necessary for each slice along an entire character segment, and then along an entire line of print, would be voluminous.

The amount of data which must be stored prior to printing can, however, be greatly reduced by recognizing that the information of a slice, such as slice 42, can be defined by the black or white color at any one point of the slice along with the pel locations at which the slice intersects the character. In moving up or down along the slice 42, a transition from light to dark or dark to light occurs at each intersection of the slice with the character image. Specifically, a slice 42 drawn through the character field from the bottom of the field to the top is initially light. The color of successive pels in the slice remains light until a contour of the character is intersected at 44. At that contour, there is a transition from light to dark. From there the pels of the slice are dark until the second contour is intersected at 46. There is then a transition from dark to light, and the pels remain light throughout the remainder of the slice.

From the above, it can be seen that the color of each pel within the slice is accurately defined by the initial light color and by the locations of intersections with the character contours. Extending that concept through the entire character field, every pel within the field can be defined by defining the contour lines where transitions are made. The data required to draw those contour lines can be stored in a substantially reduced memory space.

A compressed character defined by contours is conveniently thought of as a stream of commands to an x-y plotter. The commands dictate a sequence of pen motions which the plotter executes on an x-y grid. The pen has two states: "on" and "off". If, while in motion, the pen is "on", the pen's trajectory is recorded on the grid. If the pen is off, the pen's trajectory is not recorded.

Figure 5:
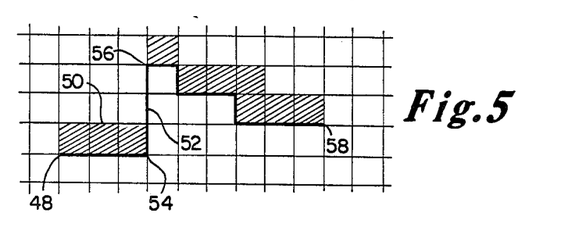
FIG. 5 illustrates the drawing of contour lines within a character field by means of compressed data codes.

Any contour can be defined by a combination of three types of commands: the point command, the line command and the curve command. Execution of the point command moves the pen to a point in the segment field whose coordinates are part of the command. As an example, a point command might move the imagined pen to point 48 of the grid of FIG. 5. Execution of the line command moves the pen in one of the four coordinate directions. As an example, a line command would provide the line 50 from point 48, and another line command would provide the vertical line 52 from point 54. When executed, the curve command moves the pen along a curve whose length, general direction, and detailed shape are encoded as part of the command. As an example, a curve command would provide the curve from point 56 to point 58 in FIG. 5.

Any characters larger than about 12 pt cannot be printed in a single segment field and are subdivided into character segments which are treated substantially independently. Such large characters are printed in adjacent character segment fields. If two or more vertical segment fields are required for a character, those fields are printed in successive scans of the fiber optic scanning head.

Figure 6A:
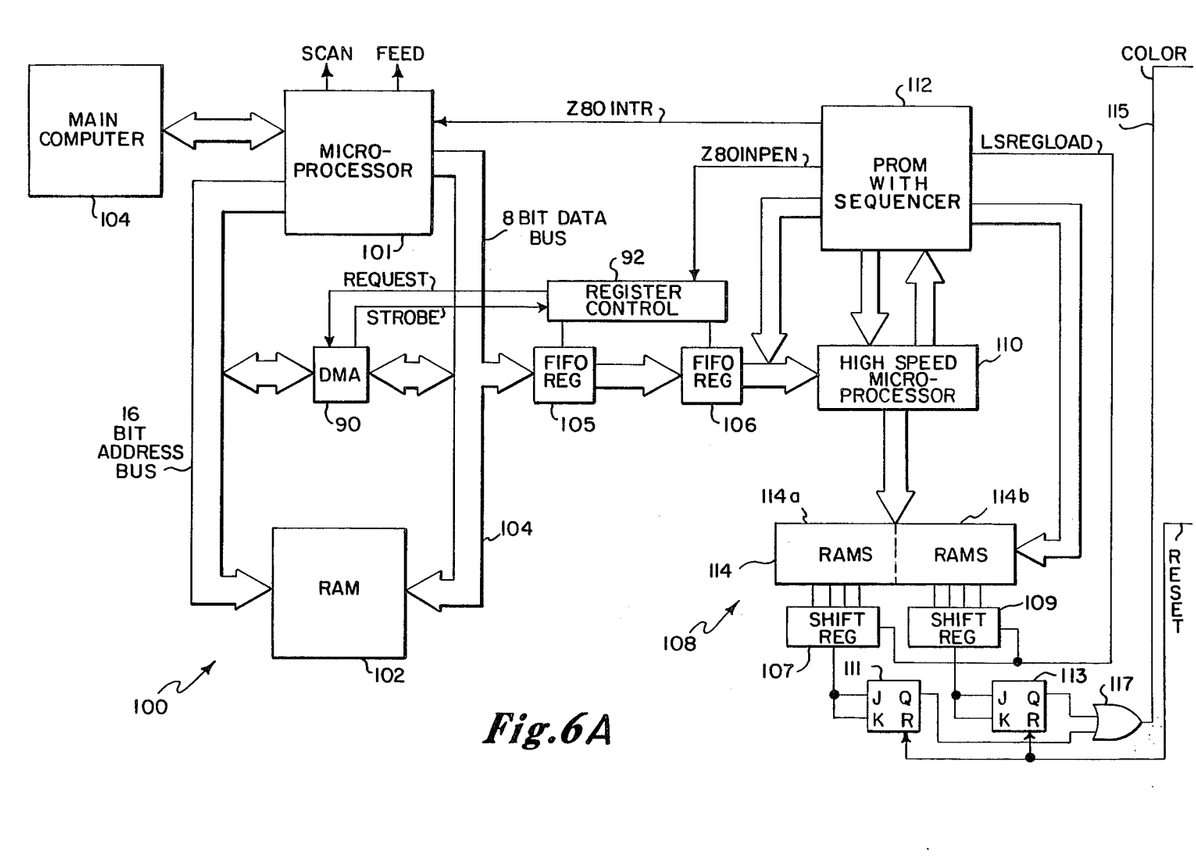
FIGS. 6A and 6B are an electrical block diagram of an electronic control system for illumination of the fiber optic filaments in synchronization with scanning of the print head of FIG. 1.
Figure 6B:
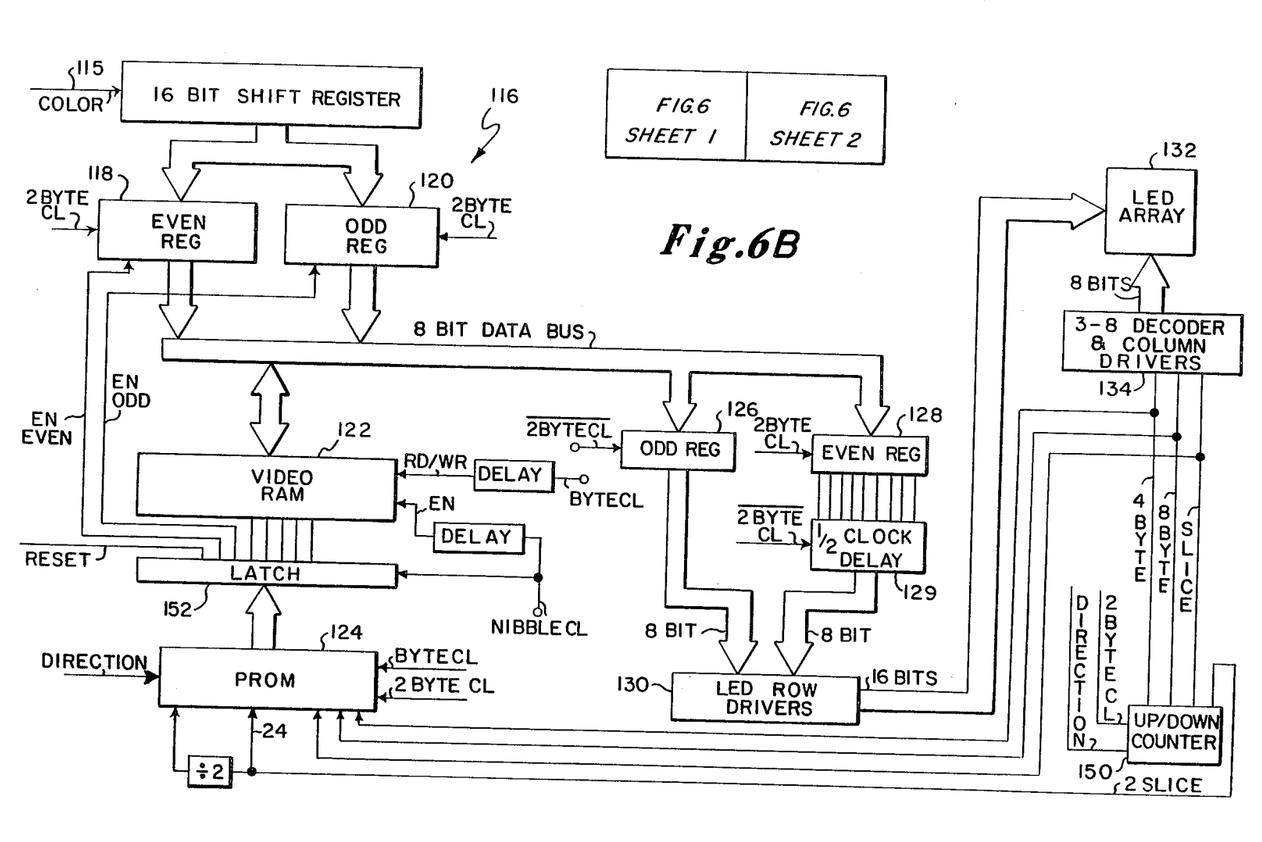

The electronic system for controlling the scanning of the fiber optic scanning head and the selective illumination of the fiber optic filaments by the LED array is shown in FIGS. 6A and 6B. The system includes a microprocessor based subsystem 100 which utilizes a Z80A type microprocessor 101 operating at 4 megahertz. This microprocessor based subsystem 100 also includes a random access memory 102.

At start-up, the Z80 program is loaded from a main computer 104 into the RAM 102. The subsystem 100 then receives font information from the main computer 104. That font information defines the contours of each permissible character of a font in compressed form as discussed above. The fonts, each of which may include up to 128 characters, are stored in the RAM 102 along with the Z80 program.

With the font information on store, the Z80 subsystem 100 is ready to convert any characters to be printed into the desired print type, such as ten point gothic or the like. The main computer 104 then reads into the Z80 subsystem 100 the specific characters to be printed on a line. This information is also stored in the RAM 102.

When the characters provided by the main computer 104 are to be printed, the subsystem 100 transmits successive characters to be printed, in compressed form determined by the font selected, along a data bus 104 through a set of first-in first-out registers 105 and 106 to a high speed microprocessor subsystem 108. The registers 105 and 106 serve as an asynchronous buffer between the two microprocessor subsystems.

In order to deliver the compressed character data to the high speed microprocessor subsystem 108 at a high rate, an 8257 type direct memory access (DMA) chip 90, operating at 3 megahertz, controls the transfer of the compressed data from the RAM 102 to the buffers 105 and 106. After a line of type has been received by the Z80 subsystem 100 and stored in the RAM, the memory access information required by the DMA to access the first two characters of the line and associated control information from memory is provided in the four channels available in the DMA. Just before the fiber optic scanning head begins to scan, the first character, defined by a long series of data bytes, is accessed from the RAM 102 and transferred through the first in, first out registers 105 and 106. As the registers are emptied of each byte by the high speed subsystem 108, a request is made by the register control circuit 92 to the DMA to access the next byte of compressed character data and strobe it into the first register 105.

Once all of the bytes for the first printed character are accessed from memory, the DMA 90 steps to its third and fourth channels which include the memory access information for the second character of the line of print. It then responds to requests from the register status circuit 92 to transfer the series of bytes for that character from RAM 102 to the first in, first out registers 105 and 106. Also, the DMA requests further memory access information from the microprocessor 101 for the third character in the line of print to replace the first character information in the first channel. The DMA continues to step from channel to channel and to request memory access information from the microprocessor for successive characters of print until the data required for an entire line of print has been transferred to the high speed subsystem 108.

The high speed subsystem 108 is based on a 2901 type microprocessor under control of microinstructions stored in a programmable read only memory (PROM) 112. Using a 6 megahertz clock, the 2901 is able to expand the compressed character font data in real time using a small buffer area. Only an amount of expanded data which is small relative to the expanded data required for an entire line of print need be stored. The 2901 receives compressed character data and expands that data as rapidly as the fiber optic scanning head scans the film on which the line of print is to be set. In the present case the expanded data for only two character segment fields need be stored at any time so that one can be expanded while another is being read to control the LED array.

Following the contours presented by the compressed data, the 2901 microprocessor stores those contours in a character buffer RAM 114. Referring back to the x-y plotter analogy, as character code information is processed by the 2901 processor system, a "1" is written into memory each time the pen steps in a horizontal direction as the pen traces the character segment outlines under control of the 2901. In the dynamic RAMs 114, each pel of a character image field has a corresponding one bit location in memory. The memory 114 can be thought of as a pel map with transitions, or contours, written into it; and one can determine whether a contour line is at a specific pel on the image field by looking to the memory 114 and determining whether the corresponding bit in memory is high or low.

Figure 7:
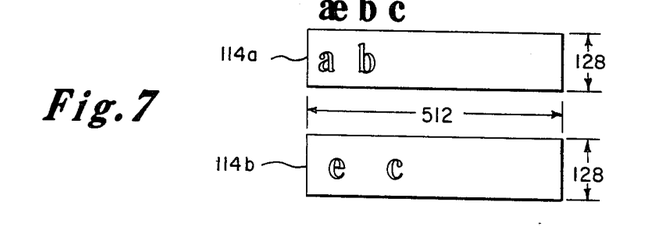
FIG. 7 is an illustration of contour lines of successive characters written into alternating RAM groups.

The buffer RAM 114 is actually two 16K×4 groups of RAMs 114a and 114b. Successive characters are written into alternating groups in order to account for overlapping characters. For example, the characters shown in FIG. 7 would be written into the two groups of RAMs 114a and 114b as shown in FIG. 7. The contour lines for the letter a would be written into the first group 114a and the contour lines of the letter "e" would be written into the second group 114b. The contour lines for the third and fourth letters "b" and c would then be written into the respective groups 114a and 114b.

Once the contour lines have been drawn into the character buffer RAMs 114 by the processor 110, the pel data is read out, eight bits (or pels) at a time, into respective registers 107 and 109. The data is read from memory 114 to form successive slices, starting from the bottom of each slice. The data in the registers 107 and 109 is shifted serially to respective color flip flops 111 and 113. Each "one" bit received by either flip flop indicates intersection of the slice with a contour line and causes a transition in the output of the flip flop. The high or low flip flop outputs control the color of corresponding pels in the slice. By combining the two bit streams in an OR gate 117, the dark pels of characters from both RAM groups 114a and 114b are provided as "ones" on line 115.

Because the color of characters is determined solely by contour lines and the color is inverted with the intersection of each contour line, overlap of separate contours prior to generation of the color data would result in improper coloring of the overlapping characters. For example, the contour line of the letter "a" might be intersected in a slice such that the color would switch to dark, and a contour line from the letter "e", intended to switch the color to dark, might then be intersected; the color would be inverted to light at the second contour—an improper output. In the present case, the colors from successive characters are derived independently from the alternating RAM groups 114a and 114b and the color is then combined in the OR gate 117. Thus a dark data signal is provided on line 115 wherever there was a dark signal in either of the overlapping characters.

The data on line 115 is shifted serially, in groups of 16 bits from single slices, into an even/odd logic circuit 116. Each set of 16 bits fed into the logic circuit 116 corresponds to two bytes of pels as shown in FIGS. 2 and 3. That is, it includes eight bits of information to control the odd byte LEDs and eight bits of information to control the even byte LEDs of a two-byte section. For each 1½ mil displacement of the scanning head, eight two-byte segments are defined by similar 16 bit streams of data from the high speed microprocessor subsystem 108. The two bytes are for a single slice, however, and not for the adjacent slices illuminated by the scanning head as shown in FIG. 3.

As just noted, the 16 bits provided at any one time on line 115 correspond to a single slice in the character field. For example, as shown in FIG. 3, the 16 bits might be for the even byte shown in solid lines and for the odd byte shown in broken lines in line with that even byte; that is, it includes even byte information for immediate control of LEDs and odd byte information to be delayed for control of the LEDs after the scanning head has moved 1½ mils. To properly control the LEDs which correspond to the even and odd fiber optic filaments, the 16 bits are divided into even and odd groups in a set of registers 118 and 120.

It should further be noted that the eight sections of two bytes in the scanning head, shown in FIG. 2, are energized sequentially and not simultaneously. The scanning movement is continous, so each set of two bytes is energized a small increment of time after the previous set. With such a system, if all eight sets of two bytes were aligned perpendicular to the direction of movement of the scanning head, there would be a near 1½ mil displacement in type in the direction of scan between the uppermost and lowermost two byte set of pels. That displacement would be viewed as a tilt in the characters.

To minimize aberrations due to sequential firing of the sets of two byte LEDs with continuous scanning movement of the scanning head, the entire array is aligned at an angle relative to the direction of scan 36. Thus, with the lowermost two byte set of filaments leading the others, the LEDs of that set can be energized as the set passes one pair of slices in the character field. By synchronizing the scan speed with the electronic timing, the second set of two-byte LEDs, is energized a short time after the first set, but the associated fibers are, at that later time, in line with the same pair of slices in the character field.

The phototypesetter prints in both the forward and reverse directions of movement of the scanning head. Thus, the two-byte set of fibers which leads in the forward direction lags in the reverse direction.

To account for the delay between even and odd fibers and to provide for both forward and reverse printing, the even and odd portions of each two-byte input for a single slice on line 115 is stored in a static video RAM 122 under the control of a programmable read only memory (PROM) 124. Also under the control of the PROM 124, the video RAM 122 outputs even and odd portions of different 16 bit inputs from line 115 into respective output registers 126 and 128. Because the even byte is read into the register 128 before the odd byte is read into register 126, the former is delayed in another register 129. Then the signals in registers 126 and 129 are applied simultaneously to a driver circuit 130 to drive 16 rows of LEDs in a LED array 132. Simultaneously, a column of LEDs corresponding to a particular two-byte set of fibers is enabled through a decoder 134.

A 93.75 kilohertz two-byte clock is available to the system, and a stepper motor which drives the scanning head is synchronized to that clock under control of the Z80 microprocessor 110. With each cycle of the two-byte clock, another column of the LED array is enabled through the decoder drivers 134, and another two-byte group of LEDs is energized according to the input from the row drivers 130. To designate which column is driven by the drivers 134, the two byte clock is divided in an up/down counter 150 to form four byte, eight byte and slice clock signals. As noted above, the two-byte groups must be energized in reverse direction when the scanning head scans in the reverse direction; thus, the up/down counter 150 counts down when a reverse direction signal is received. This causes the byte groups of fibers on the scanning head to be illuminated from top to bottom relative to the printed character during reverse direction.

It can be seen, then, that in the system of FIGS. 6A and 6B the Z80 based microprocessor 100 first supplies the font information for specific characters to be printed, in compressed form, to a 2901 based microprocessor 108. The 2901 subsystem then expands that compressed data in approximate real time and stores the expanded data in the buffer memory 114 to define the contour of each pel in a character. The conversion must be in approximate real time to minimize storage space requirements and to provide the information even as the scanning head moves quickly across the film. Then, the color information for each two byte segment of a slice of a character field is read from the memory 114 and divided into even and odd segments and stored in a video RAM 122. The pairs of bytes are read out from that RAM to control the LEDs in a manner which allows for the mechanical orientation of the individual fibers during scanning movement.

The Video RAM

As noted above, the proper sequencing of bytes read into and out of the video RAM 122 accounts for the delay between even and odd bytes on the scanning head with scanning movement; and the sequencing also accounts for the slant of the scanning head as direction is reversed. The video RAM 122 is controlled by a PROM sequencer 124 which determines the correct sequence of RAM addressing and of enabling of the even and odd data registers 118 and 120. The PROM 124 also controls resetting of the color flip flops 111 and 113 at the end of each slice. The sequencing is dependent on the direction of scanning movement. The RAM addresses and the even and odd register control signals and reset signal are latched through a latch 152.

Table 1 illustrates how sequencing of the reading and writing of bytes into and out of the RAM 122 accounts for the mechanical orientation of the fibers during bidirectional scanning movement. At each step of the sequence, a byte is read from a byte address and a new byte is written into that address. The addresses are designated by a hexadecimal numbering system.

TABLE 1

| FORWARD SETTING | | REVERSE SETTING | |
|---|---|---|---|
| Even Data Locations | Odd (Delayed) Data Locations | Even (Delayed) Data Locations | Odd Data Locations |
| RD/WR 0 | RD/WR 10 | RD/WR 0 | RD/WR 10 |
| RD/WR 1 | RD/WR 11 | RD/WR 1 | RD/WR 11 |
| RD/WR 2 | RD/WR 12 | RD/WR 2 | RD/WR 12 |
| RD/WR 3 Group 1 | RD/WR 13 Group 1 | RD/WR 3 Group 1 | RD/WR 13 Group 1 |
| RD/WR 4 | RD/WR 14 | RD/WR 4 | RD/WR 14 |
| RD/WR 5 | RD/WR 15 | RD/WR 5 | RD/WR 15 |
| RD/WR 6 | RD/WR 16 | RD/WR 6 | RD/WR 16 |
| RD/WR 7 | RD/WR 17 | RD/WR 7 | RD/WR 17 |
| RD/WR 0 | RD/WR 18 | RD/WR 8 | RD/WR 17 |
| RD/WR 1 | RD/WR 19 | RD/WR 9 | RD/WR 16 |
| RD/WR 2 | RD/WR 1A | RD/WR A | RD/WR 15 |
| RD/WR 3 Group 1 | RD/WR 1B Group 2 | RD/WR B Group 2 | RD/WR 14 Group 1 |

TABLE 1-continued

| FORWARD SETTING | | REVERSE SETTING | |
| --- | --- | --- | --- |
| Even Data Locations | Odd (Delayed) Data Locations | Even (Delayed) Data Locations | Odd Data Locations |
| RD/WR 4 | RD/WR 1C | RD/WR C | RD/WR 13 |
| RD/WR 5 | RD/WR 1D | RD/WR D | RD/WR 12 |
| RD/WR 6 | RD/WR 1E | RD/WR E | RD/WR 11 |
| RD/WR 7 | RD/WR 1F | RD/WR F | RD/WR 10 |
| Etc. | Etc. | RD/WR 7 | RD/WR 10 |
| | | RD/WR 6 | RD/WR 11 |
| | | RD/WR 5 | RD/WR 12 |
| | | RD/WR 4 Group 1 | RD/WR 13 Group 1 |
| | | RD/WR 3 | RD/WR 14 |
| | | RD/WR 2 | RD/WR 15 |
| | | RD/WR 1 | RD/WR 16 |
| | | RD/WR 0 | RD/WR 17 |
| | | RD/WR F | RD/WR 17 |
| | | RD/WR E | RD/WR 16 |
| | | RD/WR D | RD/WR 15 |
| | | RD/WR C Group 2 | RD/WR 14 Group 1 |
| | | RD/WR B | RD/WR 13 |
| | | RD/WR A | RD/WR 12 |
| | | RD/WR 9 | RD/WR 11 |
| | | RD/WR 8 | RD/WR 10 |
| | | Etc. | Etc. |

With forward scanning movement, the odd bytes must be delayed by one slice, or eight odd bytes, relative to the even bytes. To accomplish this delay, each odd byte is held in the RAM 122 for two cycles of a one-slice clock, whereas the even data bytes are held in memory for only a single cycle of a one slice clock.

Specifically, noting the "forward setting" of Table 1, an even byte is first read from address 0 and then a new even byte is written into that address from register 118. Next, an odd byte is read from address 10, and a new odd byte is written into that address from the odd register 120. In the next two byte cycle, bytes are read out of and written into the even 1 address and odd 11 address. This sequence continues through the writing of an even byte into address 7 and an odd byte into address 17. In the next two byte cycle an even byte is read from the 0 address, that byte having been stored for one cycle of a slice clock. The 10 address of the odd data locations is not read out, however. Rather, a byte is read from the 18 address and a new byte is written into that address. As the PROM sequencer continues to cause even bytes to be read from and written into the first eight even data locations, it causes odd bytes to be read from and written into 16 (hexadecimal 10 through 1F) addresses in the odd data locations. It is only after the 1F address has been filled that the sequencer causes odd data to be read from the 10 address. The byte stored in the 10 address will have been stored at that address for two cycles of the one slice clock.

The addresses can be considered as groups of eight even or odd addresses. In the forward setting, a single even group is addressed repeatedly. However, the odd data must be delayed and it is read from and written into two groups of addresses before sequencing through those groups is repeated. The added group of addresses adds a delay from the time that the data is written into the memory location to the time that it is read from the memory location.

Figure 8A:
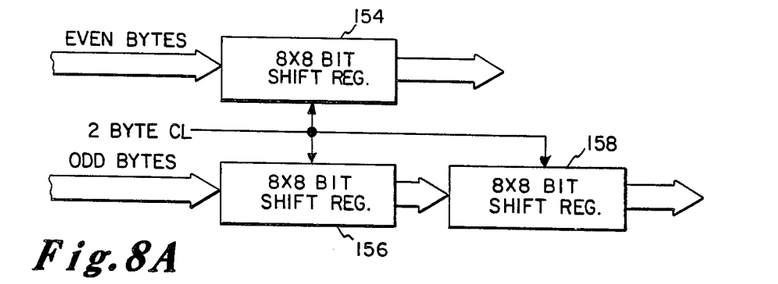
FIG. 8A illustrates a shift register analogy of the control of odd and even bytes in the system of FIG. 6 with forward scanning of the print head.

This sequencing of the even and odd bits can conveniently be considered as the shifting of bytes as parallel bits through banks of shift registers. This is illustrated by FIG. 8A. As shown, the even bytes, in the form of eight parallel bits, are fed into a bank 154 of 8×8 bit shift registers which delay each even byte by eight two-byte cycles. After that delay, each byte is read out as eight parallel bits. The odd bytes are delayed in a similar 8×8 bit cycle shift register 156. However, they are not immediately read out but are further delayed in a second 8×8 bit shift register 158.

The above description of the sequencing of bytes into and out of the video RAM 122 provides for delay of odd bytes with forward scanning movement. With reverse scanning movement, the even bytes must be delayed relative to the odd bytes; further, the bytes must be read from the RAM from top to bottom of each slice even though they are read into the RAM from bottom to top. This is accomplished by the addressing scheme shown for the "reverse setting" of Table 1. The odd bytes are read from and written into addresses 10 through 17. Then, those bytes are read from and written into the same addresses in reverse order, that is, from address 17 through address 10. This sequence is then repeated. That addressing scheme provides for a top-to-bottom output of bytes which are read in bottom-to-top.

The even bytes, which are to be delayed relative to the odd bytes, are read from and written into 16 data locations, 0 through F. Then, the first eight bytes, 0 through 7, are read out in reverse, and are followed by the next eight bytes, addresses 8 through F, read from memory in reverse. These bytes are thus read out top-to-bottom and are also delayed by one slice cycle relative to the odd bytes.

As with the forward setting, delay of data in the reverse setting is obtained by storing the delayed even data in two groups of addresses while storing the odd data in only a single group of addresses. Further, because the data must be read out in reverse, within each group the order of addressing is alternated for both even and odd data.

Figure 8B:
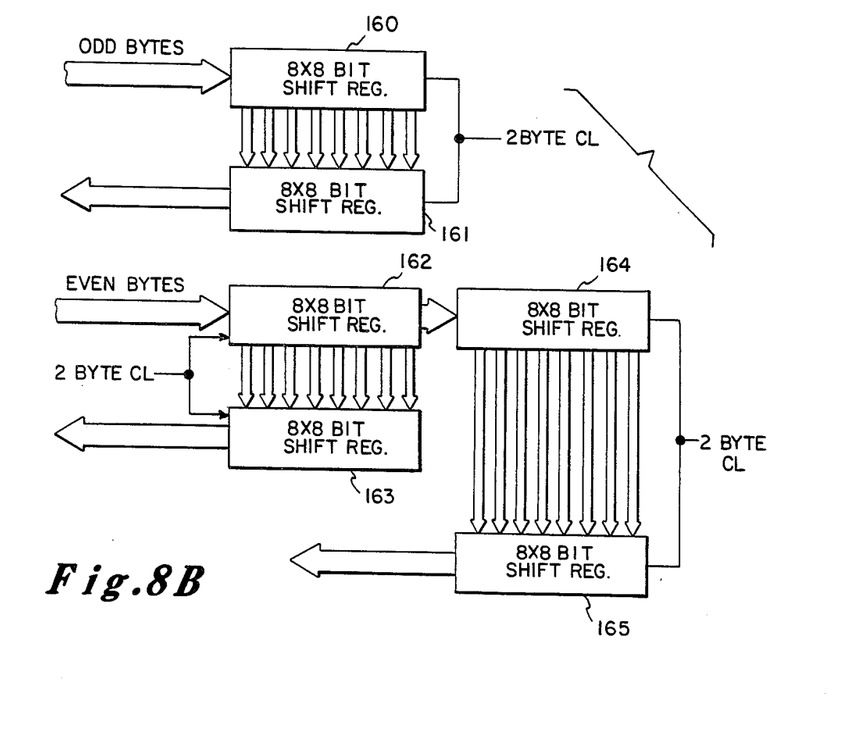
FIG. 8B illustrates a shift register analogy of the handling of odd and even bytes by the circuit of FIG. 6A in reverse scan.

The reverse scan addressing can be considered by the shift register analog of FIG. 8B. In the reverse direction, odd bytes are read into a bank 160 of shift registers. On a slice clock, they are then read in parallel into a second bank 161 of shift registers; from that bank of shift registers they are read out in reverse. The even bytes are read into two banks of shift registers 162 and 164 and are then transferred to the registers 163 and 165 on a slice clock. They are then read out, in reverse, first from the second bank of registers 165 and then from the first bank of registers 163.

Each address of the Video RAM 122 is determined by the data stored in the PROM 124 for the particular clock time within an overall four slice cycle. In the forward direction the counter 150, which generates several of the timing signals to the PROM, counts up; however, in the reverse direction, the byte and two byte clocks count up while the up/down counter 150 count downs. The mapping of addresses in the PROM 124 must take that into account.

The above-described sequence of addressing of the video RAM 122 is simplified to some extent by the physical arrangement of the present system wherein the displacement between odd and even groups of fiber optic filaments equals the displacement between character image slices. It is also simplified by the fact that the tilt of the fiber optic fibers relative to the direction of scan is such that the eight two-byte groups of fiber optic filaments span the distance between two slices. A more generalized sequencing approach can be recognized by defining three time intervals which must be compensated for in the addressing scheme.

First, a "tilt time" is the total time during which the several groups of LEDs are energized to compensate for the tilt in the scanning head relative to the direction of scan; it is the time over which the entire LED array is enabled. In this case eight two-byte groups are energized over a slice clock cycle; the tilt time is the time of one slice cycle.

Another time to be considered results from the need to first read in a slice and then read that slice out in reverse. That time can be termed the "slice time" and is the difference in times at which an odd (or even) group of fibers passes adjacent slices. Because, with reverse scan, the data for a slice cannot be read out in reverse until the entire slice has been written into memory, read-out must be delayed with reverse scan by at least one slice time. The data for any slice might actually be delayed any multiple of a slice time.

A final time that must be considered is the difference in times at which the respective even and odd groups of fibers pass a given slice. This time can be termed the "odd/even time".

In the present system, the tilt time, slice time and odd/even time are each equal to one cycle of a slice clock.

For both odd and even bytes in both forward and reverse scan, the tilt time is determined by the rate at which bytes are read out of the video RAM. Conveniently, in the present system the bytes are read into the video RAM at the same rate so that, at each address, a byte can be read from the memory address and then a new byte can be read into the address. In the analogs of FIGS. 8A and 8B, the tilt time is provided by each final shift register 154, 158, 161, 163 and 165.

With forward scan, the only additional concern is the odd/even time. With reference to FIG. 8A, that time is accounted for by the delay of the odd bytes in the register 156.

In reverse scan, one must be concerned with both the slice time and the odd/even time. For the odd bytes, only the slice time is of concern and that delay is provided by the bank of shift registers 160 in the analog of FIG. 8B. Thus the bytes are written into memory in the slice time (registers 160) and the last byte to be written in can be read out over the tilt time (registers 161).

The even bytes in reverse scan must first be delayed by the slice time and then be further delayed by the odd/even time. With reference to the analog of FIG. 8B, for the first eight bytes, the slice time is provided by the register 162 and the odd/even time is provided by the register 164. The eight bytes are then read out over the tilt time from the register 165. The second eight bytes are delayed by the slice time in the register 162. They are then delayed by the odd/even time while held in the register 163 as the first eight bytes are read from the bank of registers 165 (over the tilt time). That second group of eight bytes is finally read from the register 163 over its tilt time.

PROM With Sequencer

Figure 9:
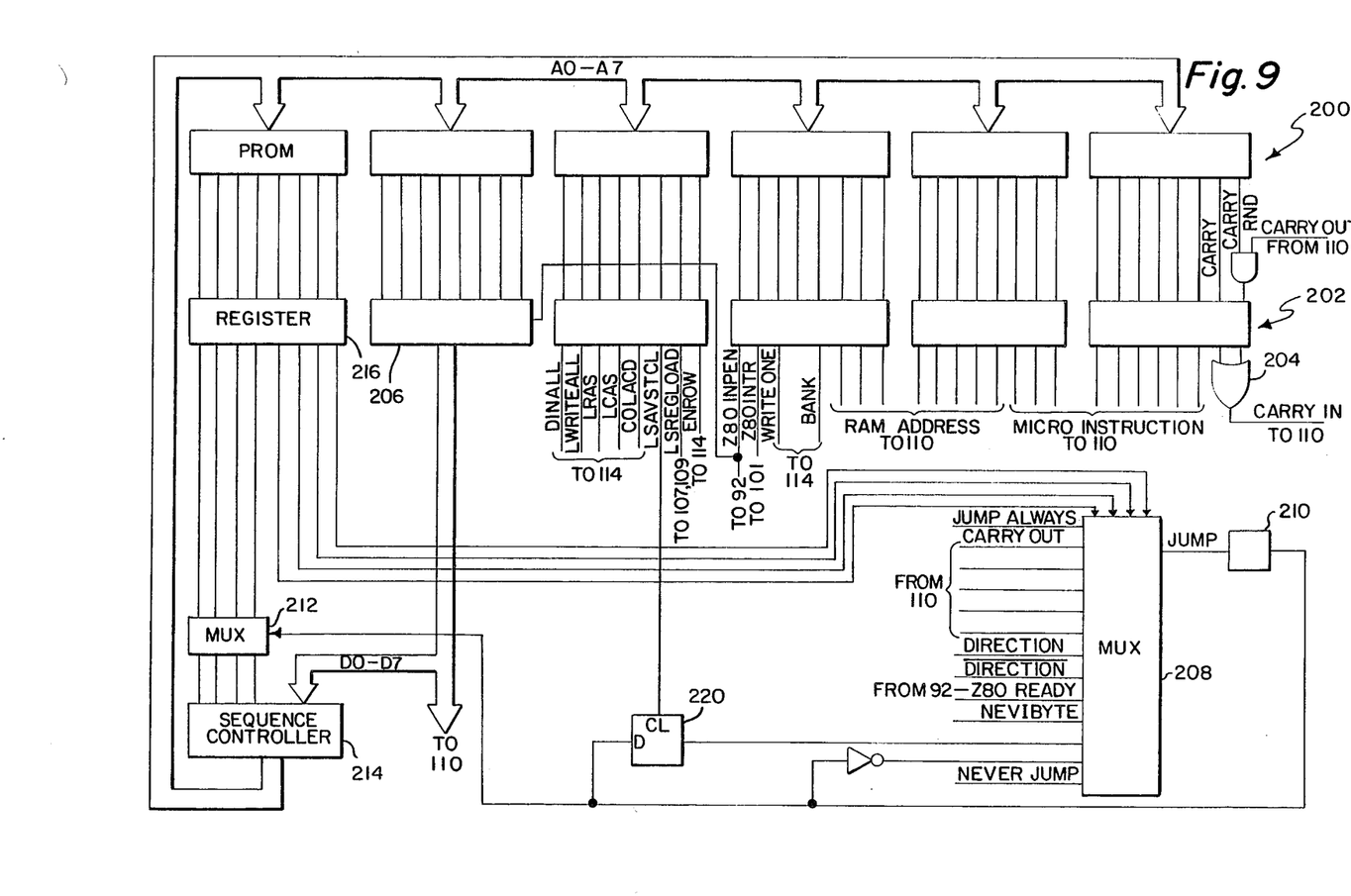
FIG. 9 is a more detailed electrical schematic of the PROM with sequencer of FIG. 6.

The PROM with sequencer 112 in the high speed microprocessor system 108 is shown in greater detail in FIG. 9. The PROM is a bank 200 of six 256×8 PROMs which provides a 48 bit output for each eight bit address. To implement a pipelining technique, the PROM outputs are latched into a bank of pipeline registers 202. As the instruction held by the registers 202 is being executed, the next instruction is being fetched by a new set of address bits applied to the PROMs 200. This increases the speed of the high speed microprocessor 108 by breaking the timing delays into two loops: the processor loop and the memory access loop. The two loops are executed in parallel.

The following is a description of each bit of the 48 bit instruction word:

The CARRY RND output is gated with a CARRY OUT bit from the 2901 microprocessor 110 to select whether the CARRY OUT of the current cycle is used as a CARRY IN for the next cycle. A CARRY signal forces a CARRY IN to the 2901 through an OR gate 204.

The next nine bits of the instruction word are a microinstruction code word readable by the 2901 microprocessor 110. This microinstruction selects arithmetic logic unit (ALU) source operands, an ALU arithmetic function and an ALU destination control. The microinstruction code word is accompanied by an eight bit address to the RAM within the 2901.

BANK and WRITE ONE bits are provided to the character buffer RAM 114. The BANK bit allows selection of one of the two memory banks in the RAM 114. The WRITE ONE bit is used in timing to generate a write pulse which allows writing into a single memory location of the character buffer RAM 114.

The Z80 INTR bit generates an interrupt to the Z80 microprocessor 101 after completion of a line of print.

A Z80 INPEN bit selects data input to the 2901 microprocessor 110 from either the FIFO register 106 (by means of the register control 92) or from the register 206. The register 206 may receive a data word from the fifth PROM of the PROM bank 200.

A seven bit row address and seven bit column address are multiplexed into the character buffer RAM 114 from the microprocessor 110. To that end, an ENROW bit controls enabling of the row and column addresses into the memory 114.

The LSREGLOAD bit controls loading of data from the character buffer memory 114 into shift registers 107 and 109 during a read operation of the memory.

The LSAVSTCL bit is used to clock a jump signal used in sequence control as discussed below.

The next five bits are applied to the character buffer memory 114. The COLACO bit controls clocking of a column address latch associated with the memory. The LCAS and LRAS bits control the column address strobe and row address strobe to the character buffer RAM. The LWRITEALL signal controls writing into the entire RAM 114 for rapid clearing of memory. The DINALL bit applies data to the address selected by the microprocessor 110.

In order to reduce the cost of the circuitry, dynamic RAMs, rather than static RAMs, were used in the RAMs 114. The disadvantage of dynamic RAMs, however, is that they require periodic refreshing of each memory cell and this in turn requires additional circuitry. The additional circuitry is required to generate memory control bits such as row address strobes (RAS), column address strobes (CAS), write signals and address control signals, and the circuitry generally includes relatively expensive analog delay lines to generate the correct timing signals. Timing of those memory control bits is critical.

The present system makes use of a dynamic RAM but avoids the need for the additional control circuitry. This is accomplished by generating the memory control bits as part of an instruction word from the program memory 200. The microinstruction from the program memory 200 also controls a refresh address register in the microprocessor 110 so that the refresh address and the memory control bits are in synchronization. Thus, the conventional dynamic RAM controller circuitry is replaced by additional program memory, and the control bits are part of the microinstruction.

Four bits from the final register of the bank of registers 202 are applied to a condition code multiplexer 208. That four bit input selects one of up to 16 inputs to the multiplexer to control a jump bit. That jump bit is applied through a latch 210 to a two-to-one multiplexer 212 which in turn applies a control input to a program sequence controller 214. The sequence controller 214 sequences through the microprogram stored in the PROM bank 200 by sequentially selecting an eight bit address to the PROM bank. The sequence controller 214 can select an address from one of four sources: (1) a set of external direct inputs received from register 206, (2) external data previously received from the register 206 and stored in an R register within the controller, (3) a four word deep push/pull stack register, or (4) a program counter register which usually contains the last address plus one. Two of the inputs from the multiplexer 212 to the sequence controller 214 control the push/pull stack. The other two inputs determine the one of four sources used to output an address to the PROMs. In the absence of a jump condition, the commands for the sequencer come from hardwired inputs to the multiplexer 212. That hardwired instruction is a continue instruction. When a jump signal is received by the multiplexer 212 from the condition code multiplexer 208, the control signals applied to the sequence controller are those received from register 216 of the register bank 202.

As previously noted, the jump signal is selected from one of a possible 16 conditions input to the multiplexer 208. Under control of its four inputs from the register 216 of the pipeline registers 202, the jump signal is selected from one of the other inputs to the multiplexer 208. A jump always input will always provide a jump in the sequence if selected. The second input to the multiplexer is a CARRY OUT bit received from the 2901 microprocessor 110. Four additional inputs from the microprocessor 110 are also applied to the condition code multiplexer 208. Direction and inverted direction bits are applied. A Z80 ready bit is asserted from the register control 92 when data is available from the register 106 of the FIFO registers. This condition code is checked before data is input from the FIFO register. A NEVIBYTE bit is synchronized with the fiber optic head scan to signal that two more video bytes are required by the odd even logic circuitry 116. Additional inputs to the condition code multiplexer 208 include a previous JUMP bit applied through an inverter 218 and a D flip flop 220. A NEVER JUMP input can also be selected.

While the invention has been particularly shown and described with reference to a preferred embodiment thereof, it will be understood by those skilled in the art that various changes in form and details may be made therein without departing from the spirit and scope of the invention as defined by the appended claims. For example, principles of the invention may be applied to arrays of imaging elements other than light sources and arrays with more than two columns of imaging elements can also be controlled with similar circuits.

It is claimed:

1. In a matrix imaging device, a method of electronically establishing the sequence of control of an array of imaging elements wherein the sequencing of individual imaging elements is dependent on the relative displacement of imaging elements in the direction of scan or on direction of scan, the method comprising:

supplying image element control data in a sequence independent of the relative displacement of imaging elements in the direction of scan and independent of direction of scan;

sequentially addressing a random access memory and writing the element control data into the random access memory at the addressed memory locations in a first order;

sequentially reading the element control data from the random access memory in an order other than said first order to delay certain of the element control data in the random access memory; and applying the element control data read from the random access memory to means for driving the array of imaging elements.

2. A method as claimed in claim 1 wherein the random access memory is sequentially addressed at addresses read from a read only memory.

3. A method as claimed in claim 1 wherein the random access memory sequential addressing is obtained from a first address sequence stored in memory for forward scan and from a second address sequence stored in memory for reverse scan.

4. A method as claimed in claim 1 wherein data is read from the memory and new data is immediately written into the memory at each address during the sequential addressing of the random access memory.

5. A method as claimed in claim 4 wherein, during reverse scan, the sequential order of addressing within groups of memory locations is alternated such that data written into the random access memory in one order within the group is subsequently read from the memory in reverse order during a subsequent address sequence.

6. A method as claimed in claim 5 wherein the data associated with display imaging elements is delayed by addressing groups of memory locations which groups are greater in number for the data to be delayed than for the data which is not to be delayed.

7. A method as claimed in claim 4 wherein the data associated with display imaging elements is delayed by addressing groups of memory locations which groups are greater in number for the data to be delayed than for data which is not to be delayed.

8. A method of electronically controlling a bidirectional scanning array of imaging elements in a matrix imaging device where the scanning array corresponds, at any instant of scan, to staggered rows of pels at adjacent character slices generally perpendicular to the direction of scan, the scanning array being slanted from the perpendicular, comprising the steps of:

providing a set of data bits grouped as bytes, each byte having at least one bit;

segregating the bytes according to the staggered leading and lagging rows of pels to which they correspond;

with forward scan, sequentially writing at least the bytes corresponding to the lagging row of pels into storage and sequentially reading those bytes out of storage in the same sequential order such that the difference in storage times for the leading and lagging bytes is an odd/even time which corresponds to the difference in times at which the staggered rows pass each slice;

in reverse scan, sequentially writing all bytes into storage and subsequently reading the bytes of successive slices out of storage in reverse order such that i. for the lagging rows, each byte is held in storage prior to readout for a slice time which corresponds to the difference in times at which each row passes adjacent slices plus an odd/even time which corresponds to the difference in times at which the staggered leading and lagging rows pass each slice, and ii. for the leading rows, each byte is stored for a slice time corresponding to the difference in times at which each row passes adjacent slices; and driving the array of imaging elements in response to the bytes read out of storage.

9. A method as claimed in claim 8 wherein the slice times and odd/even times are about equal to a tilt time corresponding to the time during which an entire array of imaging elements is energized.

10. A method as claimed in claim 8 wherein the bytes are stored in a random access memory.

11. A method as claimed in claim 10 wherein the bytes are read from and written into the random access memory according to an address sequence determined by a read only memory.

12. A method as claimed in claim 8 wherein, in reverse scan, the leading row bytes are stored in a random access memory at a number of byte addresses which correspond to the number of bytes of leading pels within a slice and the bytes are read from and written into each address sequentially, with a reversal of order of read-out/write-in after each slice, and the lagging bytes are stored in a random access memory at a number of addresses which corresponds to twice the number of bytes of lagging pels within a slice and the bytes are read from and written into the addresses sequentially through the first and second halves of the addresses and then read from and written into the first half of the addresses in reverse order and then read from and written into the second half of the addresses in reverse order.

13. A method of electronically controlling a bidirectional scanning array of imaging elements in a matrix imaging device where the scanning array corresponds, at any instant of the scan, to staggered rows of pels at adjacent character slices generally perpendicular to the direction of scan, the scanning array being slanted from the perpendicular, comprising the steps of:

providing a set of data bits grouped as bytes, each byte having at least one bit;

segregating the bytes according to the staggered leading and lagging rows of pels to which they correspond;

with forward scan, sequentially reading at least the bytes corresponding to the lagging row of pels into storage and sequentially reading those bytes out of storage in the same sequential order such that the difference in storage times for the leading and lagging bytes is an odd/even time which corresponds to the difference in times at which the staggered rows pass each slice;

in reverse scan, sequentially reading all bytes into storage and subsequently reading the bytes of successive slices out of storage in reverse order such that i. for the lagging rows, each byte is held in storage prior to readout for a time equal to twice said odd/even time, and ii. for the leading rows, each byte is stored for said odd/even time; and driving the array of imaging elements in response to the bytes read out of storage.

14. A method as claimed in claim 13 wherein the bytes are stored in a random access memory.

15. A method as claimed in claim 14 wherein the bytes are read from and written into the random access memory according to an address sequence determined by a read only memory.

16. A method as claimed in claim 13 wherein, in reverse scan, the leading row bytes are stored in a random access memory at a number of byte addresses which correspond to the number of bytes of leading pels within a slice and the bytes are read from and written into each address sequentially, with a reversal of order of read-out/write-in after each slice, and the lagging bytes are stored in a random access memory at a number of addresses which corresponds to twice the number of bytes of lagging pels within a slice and the bytes are read from and written into the addresses sequentially through the first and second halves of the addresses and then read from and written into the first half of the addresses in reverse order and then read from and written into the second half of the addresses in reverse order.

17. A control circuit for controlling a bidirectional scanning array of imaging elements in a matrix imaging device where the scanning array corresponds, at any instant of scan, to staggered odd and even rows of pels at adjacent character slices generally perpendicular to the direction of scan, the scanning array being slanted from the perpendicular, the circuit comprising:

means for receiving data bits for a group of pels from both odd and even rows;

means for dividing the data bits into even and odd bytes corresponding to leading and lagging pels;

a random access memory for receiving the even and odd bytes and temporarily storing the bytes;

drive means for receiving the even and odd bytes from the random access memory and driving the array of imaging elements in response thereto; and addressing control means for controlling the addresses at which the even and odd bytes are written into memory and the timing with which the bytes are read from memory and applied to the drive means, the addressing and reading of bytes being such that a. with forward scan, at least the bytes corresponding to the lagging row of pels are written sequentially into storage and those bytes are sequentially read out of storage in the same sequential order such that the difference in storage times for the leading and lagging bytes is an odd/even time which corresponds to the difference in times at which the staggered rows each slice; and b. in reverse scan, all bytes are sequentially written into and out of storage in reverse order such that i. for the lagging rows, each byte is held in storage prior to readout for a slice time which corresponds to the difference in times at which each row passes adjacent slices plus an odd/even time which corresponds to the difference in times at which the staggered leading and lagging rows pass each slice, and ii. for the leading rows, each byte is stored for a slice time corresponding to the difference in times at which each row passes adjacent slices.

18. A control circuit as claimed in claim 17 wherein the addressing control means comprises a read only memory.

19. A control circuit as claimed in claim 17 wherein, in reverse scan, the leading row bytes are stored in a random access memory at a number of byte addresses which correspond to the number of bytes of leading pels within a slice and the bytes are read from and written into each address sequentially, with a reversal of order of read-out/write-in after each slice, and the lagging bytes are stored in a random access memory at a number of addresses which corresponds to twice the number of bytes of lagging pels within a slice and the bytes are read from and written into the addresses sequentially through the first and second halves of the addresses and then read from and written into the first half of the addresses in reverse order and then read from and written into the second half of the addresses in reverse order.

20. A method of controlling addressing and/or refreshing of a data memory in a program controlled electronic processor system having a central processor, a program memory and a data memory, comprising:

sequencing through a program stored in the program memory and outputting a multibit instruction word from the program memory, the instruction word comprising bits corresponding to the instruction bits and address bits required by and directed to the central processor and additional data memory control bits; and inputting the data memory control bits to the data memory to control addressing and/or refreshing of the data memory.

21. A method as claimed in claim 20 wherein the data memory control bits include a row address strobe and column address strobe to the data memory.

22. A method as claimed in claim 20 wherein the data memory is a dynamic RAM.

23. A method of electronically controlling a scanning array of imaging elements in a matrix imaging device comprising:

writing a character contour into an electronic memory where memory addresses correspond to specific pel locations in a character image; and for successive slices of pels in the character image:

sequentially reading data from the electronic memory corresponding to a slice of pels in the character image, providing color data for each pel in said slice of pels by changing the pel color as a character contour is intersected, and applying the color data to means for controlling the array of imaging elements.

24. A method as claimed in claim 1 wherein character contours of successive image characters are written into alternate memory segments and wherein color data from the separate memory segments is combined in logic circuitry.

25. An electronic control for a scanning array of imaging elements in a matrix imaging device comprising:

a random access memory;

means for writing a character contour into the random access memory, memory addresses corresponding to specific pel locations in a character image;

means for sequentially reading from the electronic memory data corresponding to a slice of pels in the character image; and means for providing color data for each pel in the character image by changing the pel color as a character contour is intersected in reading data from the electronic memory.

26. An electronic control as claimed in claim 3 further comprising means for writing character contours of successive image characters into alternate memory segments and means for combining the color data provided from the respective memory segments to provide color data for the successive image characters.

* * * * *

UNITED STATES PATENT AND TRADEMARK OFFICE
CERTIFICATE OF CORRECTION

PATENT NO. : 4,739,352

DATED : April 19, 1988

INVENTOR(S) : Donald E. Gorelick
John M. Rockstroh

It is certified that error appears in the above-identified patent and that said Letters Patent is hereby corrected as shown below:

Column 19, line 8, after "rows" insert --pass--

Signed and Sealed this

Sixth Day of September, 1988

*Attest:*

DONALD J. QUIGG

*Attesting Officer*   *Commissioner of Patents and Trademarks*